(12) United States Patent
Gilliard et al.

(10) Patent No.: US 9,528,361 B2
(45) Date of Patent: Dec. 27, 2016

(54) PROCESS FOR RECOVERING SODA VALUES FROM UNDERGROUND SODA DEPOSITS

(71) Applicant: SOLVAY SA, Brussels (BE)

(72) Inventors: Pierre Gilliard, Namur (BE); Alain Vandendoren, Wazembeek-Oppem (BE)

(73) Assignee: Solvay SA, Brussels (BE)

( * ) Notice: Subject to any disclaimer, the term of this patent is extended or adjusted under 35 U.S.C. 154(b) by 0 days.

(21) Appl. No.: 14/651,338

(22) PCT Filed: Dec. 12, 2013

(86) PCT No.: PCT/EP2013/076382
§ 371 (c)(1),
(2) Date: Jun. 11, 2015

(87) PCT Pub. No.: WO2014/090947
PCT Pub. Date: Jun. 19, 2014

(65) Prior Publication Data
US 2015/0315893 A1    Nov. 5, 2015

(30) Foreign Application Priority Data
Dec. 13, 2012   (EP) .................................... 12196981

(51) Int. Cl.
*E21B 43/40* (2006.01)
*E21B 43/28* (2006.01)
*C01D 7/12* (2006.01)

(52) U.S. Cl.
CPC .............. *E21B 43/40* (2013.01); *C01D 7/126* (2013.01); *E21B 43/28* (2013.01)

(58) Field of Classification Search
None
See application file for complete search history.

(56) References Cited

U.S. PATENT DOCUMENTS 2,388,009 A * 10/1945 Pike ........................ C01D 7/14
                                                                  23/302 T
2,962,348 A * 11/1960 Seglin .................... C01D 7/126
                                                                  23/302 R
(Continued)

OTHER PUBLICATIONS

Garrett, et al.—Natural Soda Ash: Occurrences, Proceedings, and Use—Green River, Wyoming (Jan. 1, 1992) Van Nostrand Reinhold, New York, US Section B 'Production', Chapters 8-12; pp. 296-442 (180 pages).

*Primary Examiner* — Angela M DiTrani
*Assistant Examiner* — Anuradha Ahuja
(74) *Attorney, Agent, or Firm* — Beatrice C. Ortego

(57) ABSTRACT

Process for recovering soda values from first and second soda deposits situated respectively in first and second underground cavities containing respectively first and second soda solutions, the second soda solution containing a higher concentration in sodium chloride and/or sodium sulfate than the first soda solution, the process comprising: extracting a stream of first soda solution from the first cavity; introducing the stream of first soda solution in a first process which produces first soda crystals and a first waste purge stream containing a higher concentration in sodium chloride and/or in sodium sulfate than the first soda solution; introducing at least part of the first waste purge stream in the second cavity; extracting a stream of second soda solution from the second cavity; and introducing the stream of second soda solution in a second process which produces second soda crystals which have a higher concentration in sodium chloride and/or sodium sulfate than the first soda crystals.

17 Claims, 1 Drawing Sheet

(56) References Cited

U.S. PATENT DOCUMENTS

| | | | |
|---|---|---|---|
| 3,131,996 A * | 5/1964 | Seglin | C01D 7/126 23/302 T |
| 3,184,287 A * | 5/1965 | Gancy | C01D 7/12 299/5 |
| 3,273,959 A * | 9/1966 | Miller | C01D 7/123 423/182 |
| 3,655,331 A * | 4/1972 | Seglin | C01D 7/126 23/302 R |
| 4,039,617 A * | 8/1977 | Kuo | C01D 7/00 23/302 T |
| 4,160,812 A | 7/1979 | Conroy et al. | |
| 4,232,902 A | 11/1980 | Cuevas | |
| 4,344,650 A * | 8/1982 | Pinsky | E21B 43/28 299/4 |
| 4,498,706 A | 2/1985 | Ilardi et al. | |
| 4,519,806 A * | 5/1985 | Copenhafer | C01B 7/24 23/302 T |
| 4,636,289 A | 1/1987 | Mani et al. | |
| 5,043,149 A * | 8/1991 | Frint | C01D 7/126 23/302 T |
| 5,192,164 A * | 3/1993 | Frint | C01D 7/126 299/11 |
| 5,262,134 A * | 11/1993 | Frint | C01D 7/14 23/302 T |
| 5,283,054 A * | 2/1994 | Copenhafer | C01D 7/126 23/302 T |
| 5,618,504 A * | 4/1997 | Delling | C01D 7/00 423/206.2 |
| 5,690,390 A * | 11/1997 | Bithell | E21C 41/16 166/50 |
| 5,955,043 A | 9/1999 | Neuman et al. | |
| 6,322,767 B1 | 11/2001 | Neuman et al. | |
| 6,609,761 B1 * | 8/2003 | Ramey | C01D 7/12 299/5 |
| 2002/0192140 A1 * | 12/2002 | Smith | C01D 7/126 423/421 |
| 2003/0049192 A1 * | 3/2003 | Braman | C01D 7/10 423/266 |
| 2003/0143149 A1 * | 7/2003 | Braman | C01D 7/00 423/426 |
| 2004/0026982 A1 | 2/2004 | Ramey et al. | |
| 2006/0039842 A1 * | 2/2006 | Day | C01D 7/00 423/206.1 |
| 2006/0120942 A1 * | 6/2006 | Ramey | C01D 7/12 423/427 |
| 2007/0140945 A1 * | 6/2007 | Copenhafer | C01D 7/12 423/421 |
| 2010/0226840 A1 * | 9/2010 | Phillip | C01D 5/14 423/184 |

* cited by examiner

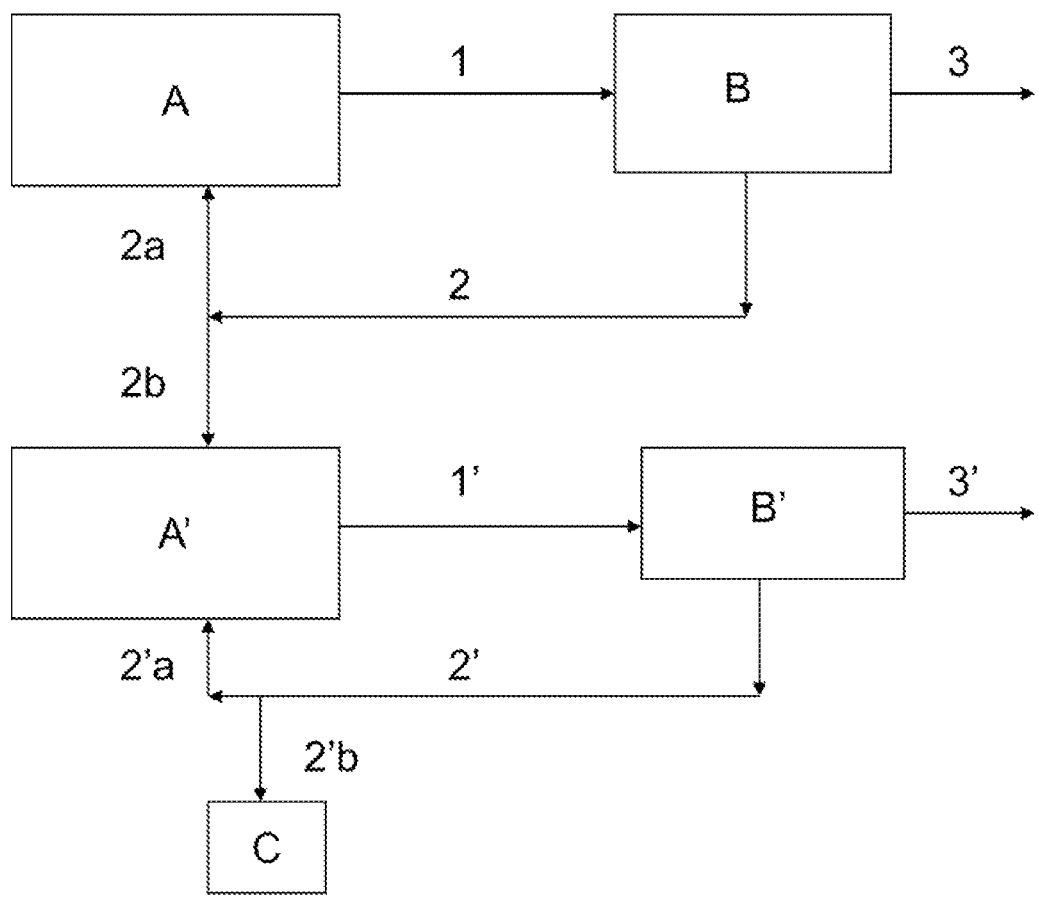

PROCESS FOR RECOVERING SODA VALUES FROM UNDERGROUND SODA DEPOSITS

CROSS-REFERENCE TO RELATED APPLICATIONS

The present application is a U.S. national stage entry under 35 U.S.C. §371 of International Application No. PCT/EP2013/076382 filed Dec. 12, 2013, which claims priority to European Patent application No. 12196981.0 filed Dec. 13, 2012, the whole content of which being incorporated herein by reference for all purposes.

FIELD OF THE INVENTION

This invention relates to a process for recovering soda values from underground soda deposits, in particular from Trona, Nahcolite or from other mineral underground deposits, rich in sodium bicarbonate values, such as Wegscheiderite or Decemite, wherein the deposits contain high levels of impurities, such as for instance sodium chloride or sodium sulfate.

BACKGROUND OF THE INVENTION

Nahcolite is an ore consisting primarily of sodium bicarbonate ($NaHCO_3$). There are for instance vast quantities of Nahcolite in the Piceance Creek Basin in Northwestern Colorado, which deposits are in the form of beds and disseminated crystals in the Saline Zone of the Green River formation.

Trona ore is a mineral that contains about 90-95% sodium sesquicarbonate ($Na_2CO_3.NaHCO_3.2H_2O$). A vast deposit of mineral trona is found in southwestern Wyoming near Green River. This deposit includes beds of trona and mixed trona and halite (rock salt or NaCl). By conservative estimates, the major trona beds contain about 75 billion metric tons of ore. The different beds overlap each other and are separated by layers of shale. The quality of the trona varies depending on its particular location in the stratum.

A typical analysis of the trona ore mined in Green River is as follows:

TABLE 1

| Constituent | Weight Percent |
| --- | --- |
| $Na_2CO_3$ | 43.6 |
| $NaHCO_3$ | 34.5 |
| $H_2O$ (crystalline and free moisture) | 15.4 |
| NaCl | 0.01 |
| $Na_2SO_4$ | 0.01 |
| $Fe_2O_3$ | 0.14 |
| Organics | 0.3 |
| Insolubles | 6.3 |

The sodium sesquicarbonate found in trona ore is a complex salt that is soluble in water and dissolves to yield approximately 5 parts by weight sodium carbonate ($Na_2CO_3$) and 4 parts sodium bicarbonate ($NaHCO_3$), as shown in the above analysis. The trona ore is processed to remove the insoluble material, the organic matter and other impurities to recover the valuable alkali contained in the trona.

The most valuable soda value produced from trona is sodium carbonate. Sodium carbonate is one of the largest volume commodities made in the United States. In 1992, trona-based sodium carbonate from Wyoming comprised about 90% of the total U.S. soda ash production. Sodium carbonate finds major use in the glass-making industry and for the production of sodium bicarbonate (also called baking soda), detergents and paper products.

A common method to produce sodium carbonate from trona ore is known as the "monohydrate process". In that process, crushed trona ore is calcined (i.e., heated) into crude sodium carbonate which is then dissolved in water. The resulting water solution is purified and fed to a crystallizer where pure sodium carbonate monohydrate crystals are crystallized. The monohydrate crystals are separated from the mother liquor and then dried into anhydrous sodium carbonate. A purge waste stream is extracted from the mother liquor and discharged from the process and sent for instance to storage ponds, in order to keep the impurities level at a specified value. The disposal of this purge stream can raise problems, particularly when the trona ore contains high concentrations in impurities, which requires higher flow rates of purge streams.

The soda values can be extracted from the underground deposits by mechanical mining. Such mining is however very expensive and requires large deposits, allowing penetration of humans and large machines. Attempts to reduce the cost of extraction and to exploit deposits having smaller layers of ore have been made, by the use of solution mining methods. For example U.S. Pat. No. 4,636,289 discloses a method for recovering sodium carbonate from trona and other mixtures of sodium carbonate and sodium bicarbonate. In U.S. Pat. No. 4,636,289, sodium hydroxide is produced in electrodialytic cells and used to solution mine the mineral ore. However, this process requires the introduction of sodium sulfates into the acid compartments of the electrodialysers, which appears to be difficult to put into practice in a cost effective and efficient way.

In U.S. Pat. No. 4,344,650, which concerns the recovering of alkali values from underground deposits containing large amounts of impurities, is described a process wherein sodium hydroxide is introduced in a trona deposit, thereby solubilizing a portion of the trona as sodium carbonate, extraction the sodium carbonate and carbonating it into sodium bicarbonate. The sodium bicarbonate is successively crystallized, calcined, dissolved and recrystallized to eliminate the impurities. This process is however complex and requires a lot of energy for the crystallizations and calcination.

The invention aims at producing sodium carbonate and/or sodium bicarbonate from ore minerals, in a simple, economical way, avoiding the large energy consumption of the known processes.

SUMMARY OF THE INVENTION

The invention relates to a process for recovering soda values from a first and a second soda deposit situated respectively in a first underground cavity (A) and a second underground cavity (A') containing respectively a first soda solution (1) and a second soda solution (1'), the second soda solution (1') containing a higher concentration in sodium chloride and/or sodium sulfate than the first soda solution (1), the process comprising:

extracting a stream of the first soda solution (1) from the first cavity (A);

introducing the stream of the first soda solution (1) in a first process (B) which produces, out of the soda solution (1), first soda crystals (3) on one hand and a first waste purge stream (2) containing a higher concentration in sodium chloride and/or in sodium sulfate than the first soda solution (1), on the other hand;

introducing at least a part (2b) of the first waste purge stream (2) in the second cavity (A');

extracting a stream of the second soda solution (1') from the second cavity (A'); and introducing the stream of the second soda solution (1') in a second process (B') which produces, out of the second soda solution (1'), second soda crystals (3') which have a higher concentration in sodium chloride and/or sodium sulfate than the first soda crystals (3).

In the present invention, 'soda value' intends to mean an alkaline sodium carbonated compound selected from the group consisting of: sodium carbonate, sodium carbonate monohydrate, sodium carbonate heptahydrate, sodium carbonate decahydrate, sodium sesquicarbonate, wegscheiderite, sodium bicarbonate and any combinations thereof; advantageously the soda value is sodium carbonate. Preferably the soda value is in solid form, such as crystals or powder of crystals. Though in present invention the soda values may also be an aqueous suspension of the above listed alkaline sodium carbonated compounds, such as an aqueous suspension of crystals into an aqueous solution comprising sodium carbonate and/or sodium bicarbonate.

In the present invention, 'soda solution' intends to mean an aqueous solution comprising sodium carbonate and/or sodium bicarbonate.

In the present invention, 'soda crystals' intends to mean crystals of alkaline sodium carbonated compound selected from the group consisting of: sodium carbonate crystals, sodium carbonate monohydrate crystals, sodium carbonate heptahydrate crystals, sodium carbonate decahydrate crystals, sodium sesquicarbonate crystals, wegscheiderite crystals, sodium bicarbonate crystals and any combinations thereof; advantageously the soda crystals are sodium carbonate crystals.

The term 'purge stream' refers to a stream withdrawn from a part of a process to limit impurity concentration, such as: sodium chloride and/or sodium sulfate or organics or other soluble salts concentrations, advantageously sodium chloride and/or sodium sulfate concentration.

BRIEF DESCRIPTION OF THE DRAWING

FIG. 1 illustrates one embodiment of the present invention described in the Example.

DETAILED DESCRIPTION OF THE PREFERRED EMBODIMENTS

In the process according to the invention, the first cavity is a "clean" one, this meaning that it contains a "clean" soda solution, allowing the production of first soda crystals meeting well specified demanding purity specifications and the second cavity is a "dirty" one, unable anyway to produce soda meeting those specifications. The "dirty" cavity is however still suitable to produce soda crystals having less demanding purity specifications (for example for the production of sodium bicarbonate for flue gas treatment). According to the invention, at least part of the first waste purge stream is stored in the "dirty" cavity.

In usual solution mining processes coupled to monohydrate processes for the production of sodium carbonate monohydrate, the waste purge stream of the monohydrate process is reintroduced in the cavity wherefrom the soda solution is extracted. As exploitation of the cavity goes on, the concentration in impurities in the cavity increases and at a given moment, the cavity becomes "dirty", that is unable to produce soda crystals meeting the more demanding specifications. Thanks to the invention, the life of clean cavities can be extended. Total valorization of soda values is also improved since the purge stream is used to produce soda crystals, albeit less pure.

In particular embodiments of the invention, at least 10%, generally at least 20%, often at least 40%, sometimes at least 50% or 60% by weight of the waste purge stream (2) is introduced in the second cavity (A'). When the first and or second soda deposit contains high amounts of impurities, for example more than 0.5%, 1% or sometimes 1.5% by weight of sodium chloride and/or sodium sulfate, at least 70% or 80% by weight of the waste purge stream (2) can advantageously be introduced in the second cavity (A'). When the first and or second soda deposit contains more than 2.2% by weight of impurities (sodium chloride and/or sodium sulfate), it is recommended that the proportion reaches at least 90% or 100%.

In the invention, the waste purge streams allow to control the amount of impurities in the produced soda crystals. In particular embodiments of the invention, the total concentration in sodium chloride and/or sodium sulfate of the first waste purge stream is at least 2.5% by weight, preferably at least 5%, more preferably at least 7.5% or even in some circumstances at least 10%. In other embodiments of the invention, the total concentration in sodium chloride and/or sodium sulfate of the second waste purge stream is at least 5% by weight, preferably at least 7.5% more preferably at least 10%, in some circumstances at least 15% or even at least 20%.

According to the invention, first and second soda solutions are extracted from the first and second cavities. Extraction is generally performed by solution mining techniques, wherein a liquid is injected in the cavity whose concentration in sodium carbonate is increased by contacting the soda ore.

In the process according to the invention, the second soda solution contains a higher concentration in sodium chloride and/or sodium sulfate than the first soda solution. In particular embodiments, the first soda solution contains less than 2.5% by weight, preferably less than 2%, more preferably less than 1.5% advantageously less than 1%, more advantageously less than 0.9% by weight in sodium chloride and/or sodium sulfate. In other embodiments, the second soda solution contains more than 1.5% by weight, preferably more than 1.75%, more preferably more than 2%, even more preferably more than 2.5%, in some circumstances more than 3% or even more than 3.5%, exceptionally more than 4% or more than 5% by weight in sodium chloride and/or sodium sulfate.

In the invention, the first and/or second soda deposit can for instance be a Nahcolite, Wegscheiderite, Decemite or Trona deposit. Trona is preferred.

In the process according to the invention, the soda solutions contain sodium carbonate and/or sodium bicarbonate. When the extraction of the soda solution is performed using conventional solution mining, it is possible to add sodium hydroxide to the liquid injected into the cavity. Sodium hydroxide converts at least part of the sodium bicarbonate into sodium carbonate, which has a higher solubility, thereby improving effectiveness of the extraction of soda values from the cavity.

In present invention, the first process is generally selected from the group consisting of: an anhydrous sodium carbonate process, a sodium carbonate monohydrate process, a sodium carbonate heptahydrate process, a sodium carbonate decahydrate process, a sodium sesquicarbonate process, a wegscheiderite process, a sodium bicarbonate process, and any combinations thereof. The expression 'anhydrous sodium carbonate process' (or other compound X process) relates in present invention to a process comprising at least one crystallization step of anhydrous sodium carbonate (or other 'compound X' such as: sodium carbonate monohydrate, sodium carbonate heptahydrate, sodium carbonate decahydrate, sodium sesquicarbonate, wegscheiderite, sodium bicarbonate).

Examples of such processes may be found in 'Natural Soda Ash, occurrences, processing, and use' from Donald E. Garrett, 1992, Van Nostrand Rheinhold Editor, New York, Section B 'Production', Chapters 8 to 12.

In the present invention, the second process is generally selected from the group consisting of: an anhydrous sodium carbonate process, a sodium carbonate monohydrate process, a sodium carbonate heptahydrate process, a sodium carbonate decahydrate process, a sodium sesquicarbonate process, a wegscheiderite process, a sodium bicarbonate process, and any combinations thereof.

In particular embodiments of the invention, the first and/or second processes are monohydrate processes.

The processes can also comprise drying steps and carbonation units, in order to produce anhydrous sodium carbonate or sodium bicarbonate. When the soda deposit contains high levels of impurities, resulting in mother liquors containing up to 6% by weight total impurities, the second possible monohydrate process involves advantageously a multiple effect crystallizer, having generally 2, 3 or even 4 stages. Such crystallizers are less sensitive to the presence of high concentrations of impurities in the mother liquor.

In another embodiment of the invention, a second waste purge stream (2') is extracted from the second process (B'), part of this second waste purge is introduced into a pond (C) and the remaining of the flow is reintroduced into the second cavity (A'). Thanks to the invention and the production of second soda crystals, the total soda values sent to the pond, which are lost, are reduced.

In recommended embodiments, the process allows to produce first soda crystals whose total concentration in sodium chloride and/or sodium sulfate is less than 0.5%, preferably less than 0.25%, more preferably less than 0.2%, even less than 0.15%, or in certain circumstances less than 0.1% by weight.

The total concentration in sodium chloride and/or sodium sulfate of the second soda crystals can advantageously be more than 0.2%, preferably more than 0.3%, more preferably more than 0.4%, even more than 0.5% or in certain circumstances more than 0.75% by weight.

In still another embodiment, which is particularly advantageous, the first and second soda crystals are mixed, and the total concentration in sodium chloride and sodium sulfate in the mixture is at most 0.2% by weight.

The annexed FIG. 1 illustrates a particular embodiment of the invention. Details and particularities of the invention will appear from the description of the following example.

EXAMPLE

The process illustrated by FIG. 1 is operated in the following way.

In this example, first and second cavities contain trona deposits containing 84% sodium sesquicarbonate, 1.2% NaCl and 1.2% $Na_2SO_4$.

A quantity of 628 tons/hours of a first soda solution (1), comprising 135 g/kg of sodium carbonate, 40 g/kg of sodium bicarbonate, 7 g/kg of sodium chloride and 7 g/kg of sodium sulfate is extracted from the first trona cavity (A). This solution is introduced into a first monohydrate process (B), producing 76 tons/hour of sodium carbonate monohydrate crystals comprising 820 g/kg sodium carbonate, 1 g/kg sodium chloride and 1 g/kg sodium sulfate. 155 tons/hour of a first waste purge stream (2), comprising 28 g/kg sodium chloride and 28 g/kg sodium sulfate is extracted from the first monohydrate process. This stream is divided in two substreams, the first substream (2a) amounting to 95 tons/hours (60% by weight of the total first waste stream (2)) is reintroduced in the first cavity (A) and the second substream (2b), amounting to 60 tons/hour (40% by weight of the total first waste stream (2)), is introduced into the second cavity (A').

Further, a quantity of 810 tons/hours of a second soda solution (1'), comprising 130 g/kg of sodium carbonate, 51 g/kg of sodium bicarbonate, 16 g/kg of sodium chloride and 16 g/kg of sodium sulfate is extracted from the second cavity (A'). This solution is introduced into a second monohydrate process (B'), producing 112 tons/hour of sodium carbonate monohydrate crystals comprising 820 g/kg sodium carbonate, 2 g/kg sodium chloride and 2 g/kg sodium sulfate. 214 tons/hour of a second waste purge stream (2'), comprising 60 g/kg sodium chloride and 60 g/kg sodium sulfate is extracted from the second monohydrate process (B'). This stream is divided in two substreams, the first substream (2'a) amounting to 173 tons/hours is reintroduced in the second cavity (A') and the second substream (2'b) amounting to 41 tons/hour is introduced into a pond (C). Compositions and flows of the different streams of the example are summarized in TABLE 2.

TABLE 2

| Composition | | 1 | 2 | 2a | 2b | 3 | 1' | 2' | 2'a | 2'b | 3' |
|---|---|---|---|---|---|---|---|---|---|---|---|
| $Na_2CO_3$ | g/kg | 135 | 248 | 248 | 248 | 820 | 130 | 184 | 184 | 184 | 820 |
| $NaHCO_3$ | g/kg | 40 | | 0 | | | 51 | | | | |
| NaCl | g/kg | 7 | 28 | 28 | 28 | 1 | 16 | 60 | 60 | 60 | 2 |
| $Na_2SO_4$ | g/kg | 7 | 28 | 28 | 28 | 1 | 16 | 60 | 60 | 60 | 2 |
| Flow | t/h | 628 | 155 | 95 | 60 | 76 | 810 | 682 | 173 | 41 | 112 |

This disclosure of all patent applications, and publications cited herein are hereby incorporated by reference, to the extent that they provide exemplary, procedural or other details supplementary to those set forth herein.

Should the disclosure of any of the patents, patent applications, and publications that are incorporated herein by reference conflict with the present specification to the extent that it might render a term unclear, the present specification shall take precedence.

In the application, where an element or component is said to be included in and/or selected from a list of recited elements or components, it should be understood that in related embodiments explicitly contemplated here, the element or component can also be any one of the individual recited elements or components, or can also be selected from a group consisting of any two or more of the explicitly listed elements or components. Further, it should be understood that elements and/or features of an apparatus, a process, or a method described herein can be combined in a variety of ways without departing from the scope and disclosures of the present teachings, whether explicit or implicit herein.

The use of the singular herein includes the plural (and vice versa) unless specifically stated otherwise.

Accordingly, the scope of protection is not limited by the description set out above, but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention.

While preferred embodiments of this invention have been shown and described, modifications thereof can be made by one skilled in the art without departing from the spirit or teaching of this invention. The embodiments described herein are exemplary only and are not limiting. Many variations and modifications of systems and methods are possible and are within the scope of the invention.

The invention claimed is:

1. A process for recovering soda values from a first soda deposit and a second soda deposit situated respectively in a first underground cavity and a second underground cavity containing respectively a first soda solution and a second soda solution, the second soda solution containing a higher concentration in sodium chloride, in sodium sulfate, or in sodium chloride and in sodium sulfate, than the first soda solution, the process comprising:
   extracting a stream of said first soda solution from the first underground cavity;
   introducing the stream of said first soda solution in a first process which produces, out of the first soda solution, first soda crystals and a first waste purge stream containing a higher concentration in sodium chloride, in sodium sulfate, or in sodium chloride and in sodium sulfate, than the first soda solution;
   introducing at least a part of the first waste purge stream in the second underground cavity;
   extracting a stream of said second soda solution from the second underground cavity; and
   introducing the stream of said second soda solution in a second process which produces, out of the second soda solution, second soda crystals which have a higher concentration in sodium chloride, in sodium sulfate, or in sodium chloride and in sodium sulfate, than the first soda crystals.

2. The process according to claim 1, wherein a second waste purge stream is extracted from the second process, wherein a substream of said second waste purge is introduced into a pond, and wherein a remaining substream of said second waste purge is reintroduced into the second underground cavity.

3. The process according to claim 1, wherein the first soda solution has a total concentration in sodium chloride, in sodium sulfate, or in sodium chloride and in sodium sulfate, of less than 1.5% by weight.

4. The process according to claim 1, wherein the second soda solution has a total concentration in sodium chloride, in sodium sulfate, or in sodium chloride and in sodium sulfate, of more than 1.75% by weight.

5. The process according to claim 1, wherein the second soda solution has a total concentration in sodium chloride, in sodium sulfate, or in sodium chloride and in sodium sulfate, of more than 2% by weight.

6. The process according to claim 1, wherein the first process is selected from the group consisting of: an anhydrous sodium carbonate process, a sodium carbonate monohydrate process, a sodium carbonate heptahydrate process, a sodium carbonate decahydrate process, a sodium sesquicarbonate process, a wegscheiderite process, a sodium bicarbonate process, and any combinations thereof.

7. The process according to claim 6, wherein at least one of the first process and the second process is a monohydrate process.

8. The process according to claim 7, wherein one or both monohydrate processes comprise a multiple effect crystallizer.

9. The process according to claim 1, wherein the second process is selected from the group consisting of: an anhydrous sodium carbonate process, a sodium carbonate monohydrate process, a sodium carbonate heptahydrate process, a sodium carbonate decahydrate process, a sodium sesquicarbonate process, a wegscheiderite process, a sodium bicarbonate process, and any combinations thereof.

10. The process according to claim 1, wherein at least 40% in weight of the first waste purge stream is introduced in the second underground cavity.

11. The process according to claim 1, wherein at least 70% by weight of the first waste purge stream is introduced in the second underground cavity.

12. The process according to claim 1, wherein the second soda crystals have a total concentration in sodium chloride, in sodium sulfate, or in sodium chloride and in sodium sulfate, of more than 0.2% by weight.

13. The process according to claim 1, wherein the first soda crystals have a total concentration in sodium chloride, in sodium sulfate, or in sodium chloride and in sodium sulfate, of less than 0.2% by weight.

14. The process according to claim 1, wherein the first soda crystals and the second soda crystals are mixed to form a mixture, and wherein the mixture has a total concentration in sodium chloride, in sodium sulfate, or in sodium chloride and in sodium sulfate, of at most 0.2% by weight.

15. The process according to claim 1, wherein at least of one of the first and second soda deposits is a Nahcolite deposit, a Wegscheiderite deposit, a Decemite deposit, or a Trona deposit.

16. The process according to claim 1, wherein at least of one of the first and second soda deposits is a Trona deposit.

17. The process according to claim 1, wherein the first and second soda crystals are alkaline sodium carbonated compound crystals selected from the group consisting of: sodium carbonate crystals, sodium carbonate monohydrate crystals, sodium carbonate heptahydrate crystals, sodium carbonate decahydrate crystals, sodium sesquicarbonate crystals, wegscheiderite crystals, sodium bicarbonate crystals, and any combinations thereof.

* * * * *